US005215297A

United States Patent [19]

Sato et al.

[11] Patent Number: 5,215,297

[45] Date of Patent: Jun. 1, 1993

[54] GUIDE JIG FOR USE WITH ASSEMBLY PLATE FOR ASSEMBLING WIRE HARNESS

[75] Inventors: Keiichi Sato, Nagoya; Kazutaka Yada, Yokkaichi, both of Japan

[73] Assignee: Sumitomo Wiring Systems Ltd., Yokkaichi, Japan

[21] Appl. No.: 700,025

[22] Filed: May 14, 1991

[30] Foreign Application Priority Data

| | | | |
|---|---|---|---|
| May 14, 1990 | [JP] | Japan | 2-50410[U] |
| Mar. 8, 1991 | [JP] | Japan | 3-13004[U] |

[51] Int. Cl.[5] .............................................. B23Q 3/00

[52] U.S. Cl. ...................................... 269/296; 269/66; 269/74; 269/310

[58] Field of Search ........................ 269/45, 55, 66, 74, 269/296, 309, 310, 317, 329

[56] References Cited

U.S. PATENT DOCUMENTS

| | | | |
|---|---|---|---|
| 1,312,306 | 8/1919 | Campbell | 269/296 |
| 1,460,286 | 6/1923 | Stenhouse | 269/296 |
| 4,691,905 | 9/1987 | Tamura et al. | 269/296 |
| 4,964,449 | 10/1990 | Conners | 269/296 |

*Primary Examiner*—J. J. Swann

*Attorney, Agent, or Firm*—Sughrue, Mion, Zinn, Macpeak & Seas

[57] ABSTRACT

A guide jig for an assembly plate for assembling a wire harness has a support sheath extending through the assembly plate, a guide lever axially movably inserted in the support sheath and a support plate secured to the support sheath. The guide lever can be held in its pulled-up position unrotatably relative to the support sheath. The support plate protrudes below the assembly plate by a smaller length than before.

6 Claims, 10 Drawing Sheets

GUIDE JIG FOR USE WITH ASSEMBLY PLATE FOR ASSEMBLING WIRE HARNESS

BACKGROUND OF THE INVENTION

1. Field of the Invention

This invention relates to a guide jig for use with an assembly plate for assembling a wire harness which is a bundle of wires arranged in a desired form into a unit.

2. Description of the Related Art

As shown in FIG. 9, an assembly plate comprising a plate member B and guide jigs A, arranged on the plate member B at predetermined positions, is used to assemble a wire harness. Wires a cut to a predetermined length are laid along the guide jigs A to form a bundle of wires having branches in a shape suitable for the desired purpose. Tapes t are wound around the bundle to prevent the wires from loosening. Finally, clamps and protectors (hereinafter referred to as accessory parts) are put on the bundle to form a wire harness.

Modern harnesses have a more complicated branch structure. Thus a greater number of guide jigs A have to be mounted in a smaller area. Such densely mounted guide jigs A will hamper taping and mounting of the clamps and protectors, thus remarkably lowering workability.

As a solution to this problem, the present applicant proposed a guide jig A for a wire harness assembly plate in Examined Japanese Utility Model Publication 62-20103. Namely, as shown in FIG. 10, this prior art jig is vertically movable with respect to the plate member to bring it to a lower position so as not to interfere the taping and clamping.

The prior art guide jig A includes a support sheath 2 extending through and secured to the plate B, a guide lever 5 vertically slidably inserted into the support sheath 2, a support plate 4 fixedly mounted on the support sheath 2 and provided with a lock mechanism 8 adapted to engage a pin 7 provided at bottom of the guide lever 5 to hold the guide lever in its pulled-up position.

In order to ensure that the pin 7 engages the lock mechanism 8 when the guide lever 5 is pulled up, a guide means is provided to guide the guide lever vertically and unrotatably with respect to the support sheath 2. The guide means comprises a slit 6 formed in the support plate 4 to extend vertically and adapted to receive the pin 7 on the guide lever 5.

This prior art guide jig A has to have a support plate 4 having a length equal to the length of movement of the pin 7. Thus the support plate 4 protrudes considerably downwards form the plate member 1. This increases the possibility of the frame 4 being deformed or broken during transportation. Thus, it was necessary to transport the assembly plate with the guide jigs removed and assemble the plate with the guide jigs when forming a wire harness.

An object of this invention is to provide a guide jig which obviates the shortcomings of the prior art guide jig by reducing the amount of protrusion from the bottom surface of the plate member.

SUMMARY OF THE INVENTION

In accordance with the present invention, there is provided a guide jig for an assembly plate for assembling a wire harness, having a support sheath extending through the assembly plate and fixed thereto, a guide lever axially movably inserted in the support sheath, and a guide member fixed to the top of the guide lever for guiding the wire harness. The guide lever is provided, at the bottom end thereof, with an engaging portion and a support plate is fixedly mounted on the support sheath at a portion below the assembly plate and is provided with locking means for engaging with the engaging portion to hold the guide lever in its pulled-up position. The guide means is provided for guiding the guide lever so as to be movable vertically along the support sheath and unrotatable relative to the support sheath. The guide means has a guide portion provided on the guide lever so as to extend vertically and means is provided on one of the support sheath and the support plate for engaging with the guide portion to prevent the guide lever from turning relative to the support sheath.

The turn preventive means provided on the support sheath or support plate is adapted to engage the engaging portion on the guide lever to extend along its length, thereby preventing the guide lever from turning relative to the guide sheath. This makes it possible to reduce the length of the support plate and thus the length of the guide jig below the assembly plate.

Other features and objects of the present invention will become apparent from the following description taken with reference to the accompanying drawings, in which:

FIG. 1 is a partially exploded perspective view of the guide jig for an assembly plate for assembling a wire harness;

FIG. 2*a* is a sectional front view of the guide jig showing its assembled state, and FIG. 2*b* is a sectional side view of the same;

FIGS. 3*a*-3*e* are views of the guide jig showing its different operational positions;

FIG. 4 is a perspective view of the wire harness assembly plate showing how it is packaged;

FIG. 5*a* is an exploded perspective view of the second embodiment, and FIGS. 5*b* and 5*c* are sectional views of the same;

FIG. 6*a* is an exploded perspective view of the third embodiment, and FIGS. 6*b* and 6*c* are sectional views of the third embodiment;

FIG. 7*a* is an exploded perspective view of the fourth embodiment, and FIG. 7*b* is a sectional view of the same;

FIGS. 8*a*-8*f* are views of the fourth embodiment, showing different operational positions;

FIG. 9 is a perspective view of a wire harness showing how it is laid; and

FIG. 10*a* is a front view of the prior art, and FIG. 10*b* is a right-side view of the same.

DETAILED DESCRIPTION OF THE PREFERRED EMBODIMENTS

Figure 1:
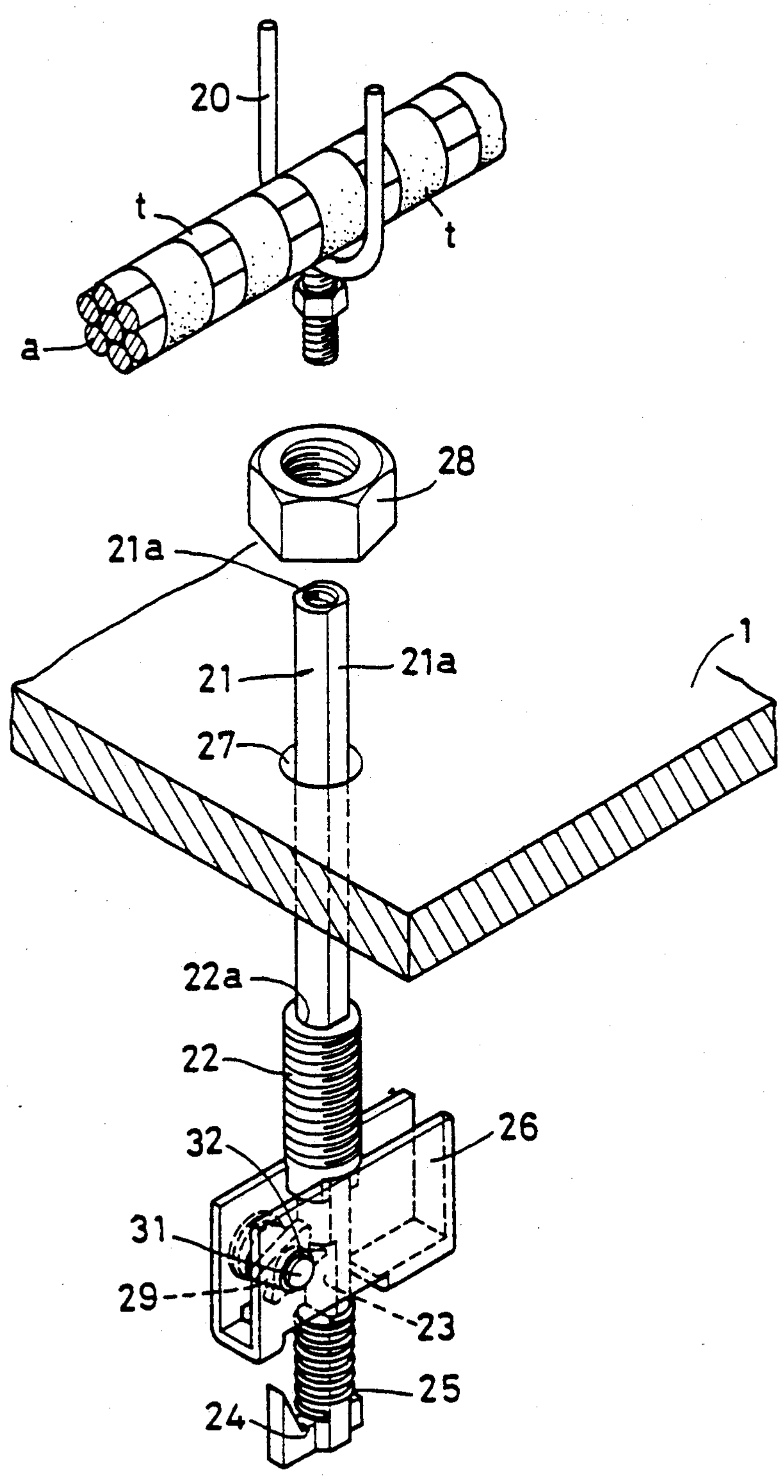
Figure 2A:
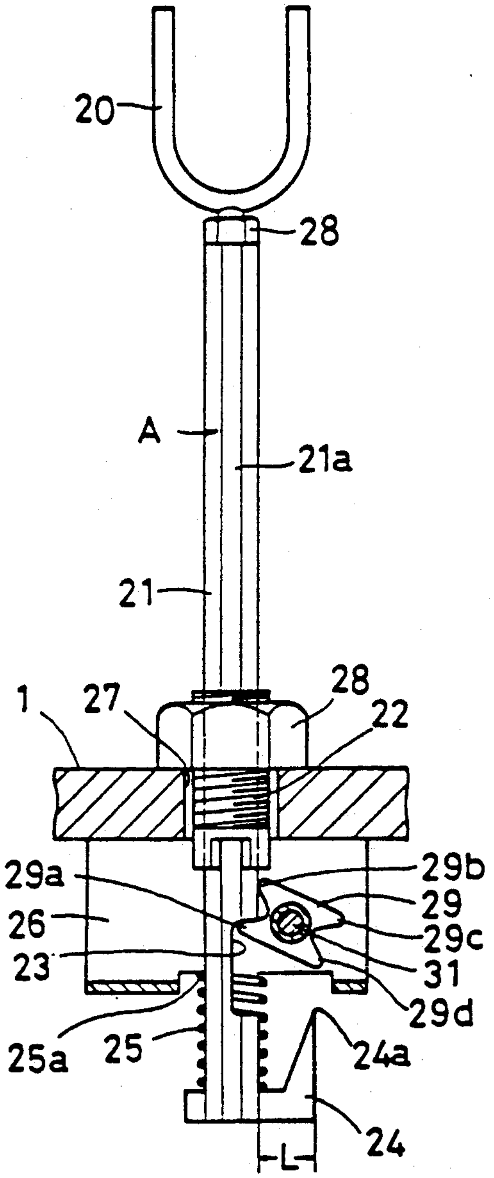
Figure 2B:
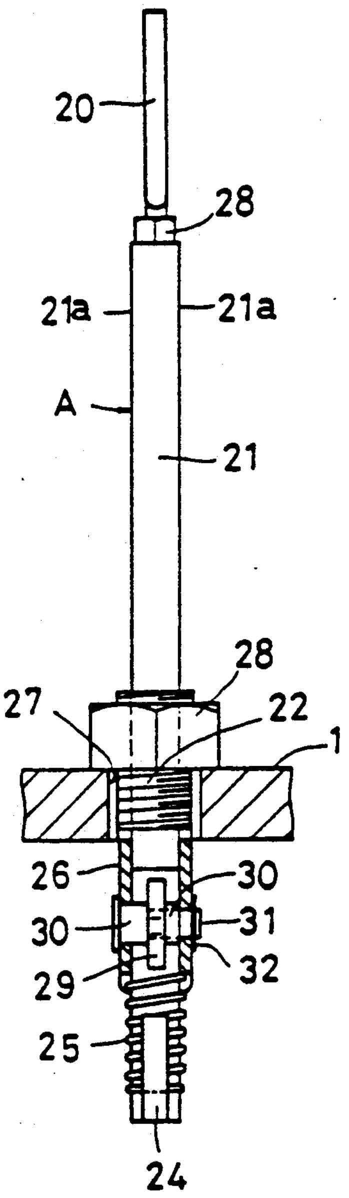

As shown in FIG. 1, a guide portion 20 for supporting wires a (bundle of wires) is screwed into a guide lever 21 and fixed thereto (FIG. 2). The guide lever 21 extends through a support sheath 22.

The guide lever 21 has both sides thereof cut to form flat surfaces 21*a*. The support sheath 22 is formed with a through hole 22*a* having the same cross-section as the guide lever 21 so that the guide lever is supported so as to be unrotatable but movable in the axial direction. The guide lever 21 may also be held unrotatable by a key and groove structure. The guide lever 21 a longitudinally elongated groove 23 formed in a lower part thereof.

A support plate 26 is fixed to a lower surface of an assembly plate 1 and is provided with a lock mechanism which engages in a groove 23 and holds the guide lever in its upper position. The lock mechanism includes a cam plate 29, an L-shaped piece 24 and a coil spring 25 mounted on the guide lever 21 between the L-shaped piece 24 and the coil spring 25.

The cam plate 29 is H-shaped having two pairs of projections opposed in a symmetric relation with respect to the axis of rotation of the cam plate 29 (see FIG. 2). The cam plate 29 is loosely mounted on a shaft 31 which extends through the support plate and is positioned by virtue of an E ring 32 and a spacer 30.

Figures 3A, 3B, 3C, 3D, 3E:
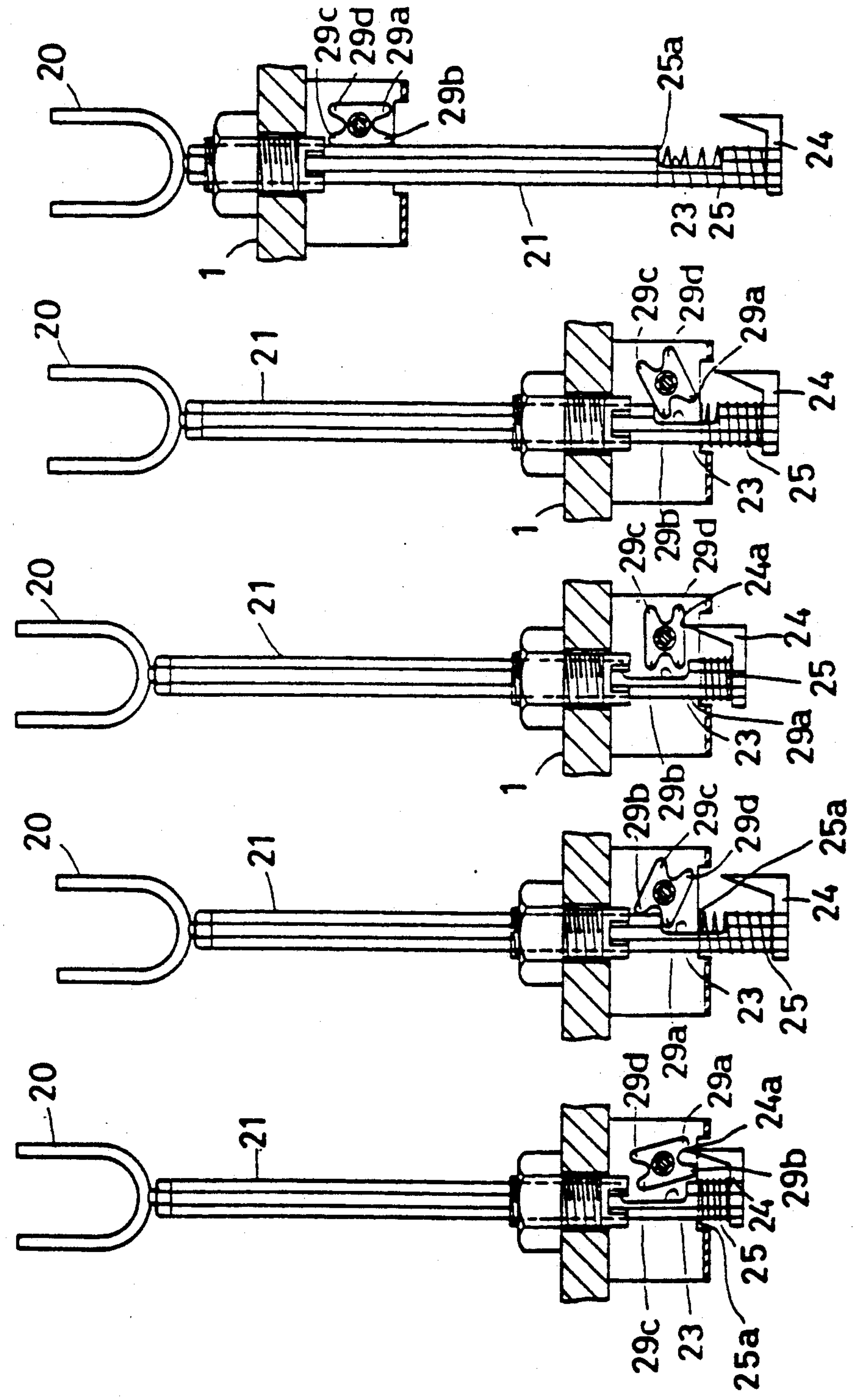

The groove 23 has such a depth and length that the cam plate 29 can freely rotate when it is centered with respect to the length of the groove 23 when lever 21 is in the position illustrated in FIGS. 3*a* and 3*c*. In particular, the distance between the axis of rotation of the cam plate 29 and the surface of the guide lever 21 is set to be larger than the distance from the axis of rotation to the each side edge of the cam plate 29 which extend between projections 29*d* and 29*a* and projections 29*c* and 29*b*, respectively.

The coil spring 25 is adapted to be pressed against the support plate 26 when a lower one of the pair of projections abuts against the top shoulder portion of the groove 23 and the upper one of the pair of projections abuts against the periphery of the guide lever 21 above the groove 23, as illustrated in FIG. 2(*a*).

The L-shaped piece 24 has a first portion extending parallel to a bottom edge of the assembly plate 1 for a predetermined length L and a second portion extending vertically from the free end of the first portion toward the assembly plate. The length L is so set that as shown in FIG. 2*a*, the tip 24*a* of the L-shaped piece will move in a plane opposite the axis of rotation of the cam plate 29 with respect to lever 21, and also moves within the radial range of rotation of the cam plate.

The L-shaped piece 24 has a vertical length such that when the spring 25 is compressed, from the state shown in FIG. 3(*e*), between support plate 26 and L-shaped piece 24, to the limit thereof, tip 24*a* will pass into an area between lower projections 29*a* and 29*b* of the cam plate 29, abut against the cam plate 29 and thus rotate cam plate 29 so that projection 29*c* will engage in the groove 23.

Now the operation of this embodiment is described with reference to FIGS. 3*a*–3*e*.

FIG. 3*b* shows the state or level of guide portion 20 for laying wires therein. One 29*a* of the bifurcated projections 29*a* and 29*b* of the cam plate 29 is in engagement with the top end of the groove 23 in the guide lever 21 and the other projection 29*b* with the side of the guide lever 21. Also, the guide lever 21 is biased downwards by the spring 25. Thus, the cam plate 29 is prevented from turning counterclockwise further and the guide lever 21 is held at ths level. Namely, while laying wires, any undue lowering of the guide lever 21 by the biasing force of the spring 25 is prevented.

As shown in FIG. 3*c*, when the guide lever 21 is pulled up, by the operator, in this state, as the cam plate 29 pivots while being pushed by the tip 24*a* of the L-shaped piece 24 such that projections 29*a* and 29*b* are received in the groove 23. Thus, as shown in FIG. 3*d*, when the guide lever 21 is released, it will descend biased by the spring 25, thus pivoting the cam plate 29 with the shoulder of the grooves 23 so that it will take a vertical H position. This allows the guide lever 21 to move further down. As shown in FIG. 3*e*, the guide lever 21 descends further by gravity and stops when the guide portion 20 abuts the plate member 1. In this state in which the bundle of wires are kept afloat by either portions of the wire harness which are supported in other guide portions 20, accessory parts are mounted.

Then when the operator raises the guide lever 21 until the coil spring 25 is compressed to the limit as shown in FIG. 3*a*, the tip 24*a* of the L-shaped piece 24 will come into abutment with the outer one 29*a* of the lower bifurcated projections 29*a* and 29*b*, thus pivoting the cam plate 29. Thus, the inner one 29*c* of the upper bifurcated projections 29*c* and 29*d* enters into the groove 23. When the guide lever 21 is released in this state, it will descend biased by the coil spring 25, so that the bifurcated projection 29*c* engages the top end of the groove 23 while the other one 29*d* abuts the side of the guide lever 21. Namely, the entire device returns to the level for laying wires shown in FIG. 3*b* and are kept in this state.

The level for laying wires can be changed by removing the guide portion 20, pulling out the guide lever 21 downwards and inserting a guide lever of a desired length into the support sheath 22. This allows the manufacturer and user to control the guide levers 21 and the support plates 26 separately. They can manufacture or order guide levers of different heights according to the desired levels for laying wires. This permits a substantial reduction in cost.

In the abovementioned embodiment, by providing the flat surfaces 21*a* on the guide lever 21 and the complementary flat surfaces 22*a* on the support sheath 22, both members 21 and 22 are prevented from turning with respect to each other. Further by securing the support plate 26 to the support sheath 22, the support sheath 22 can be stably supported by the plate 1.

Figure 4:
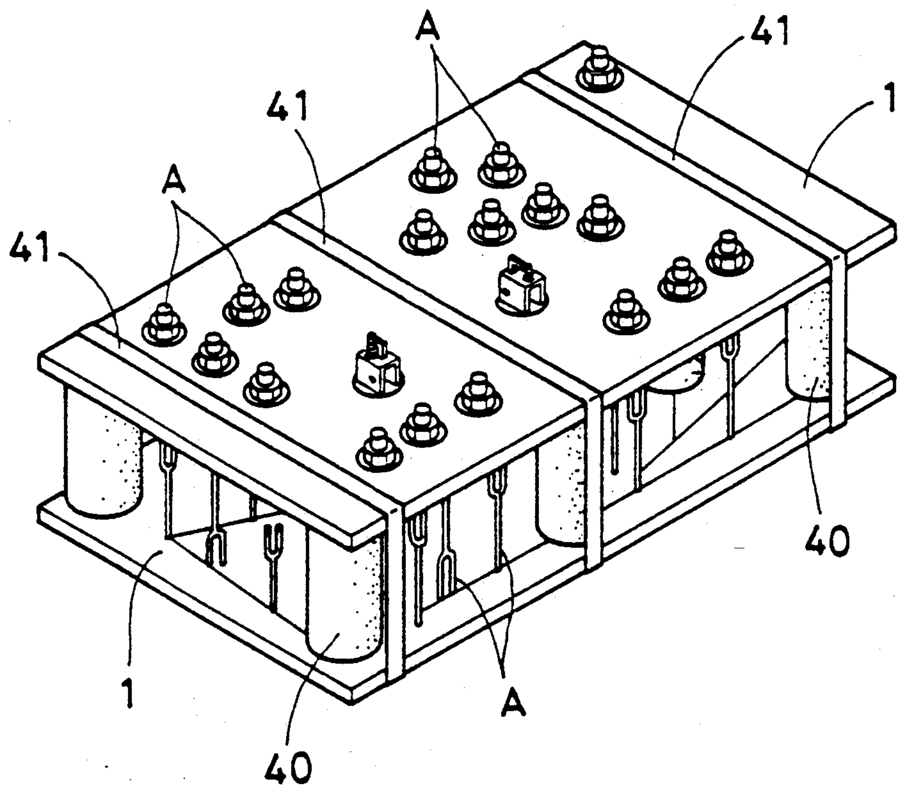

Further, since the cam plate 29 is covered by the support plate 26, the elevating mechanism including the cam plate 29 is protected against damage even if they are interfered with by the assembly plate during assembly. Also, they are protected against damage by hand. The assembly plates thus assembled may be packed, e.g. with paper pipes 40 and tapes 41 with two assembly plates brought together face to face as shown in FIG. 4.

FIGS. 5 and 6 show a guide jig according to a second embodiment provided with a locking mechanism similar to that of the above-mentioned embodiment. Means for preventing the guide lever 21 from turning are different from those of the first embodiment, however.

Figure 5A:
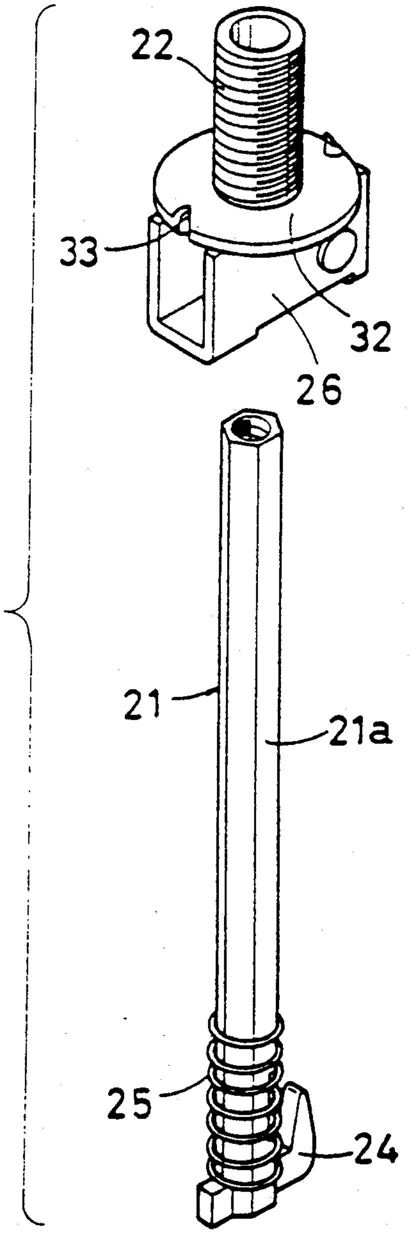
Figure 5B:
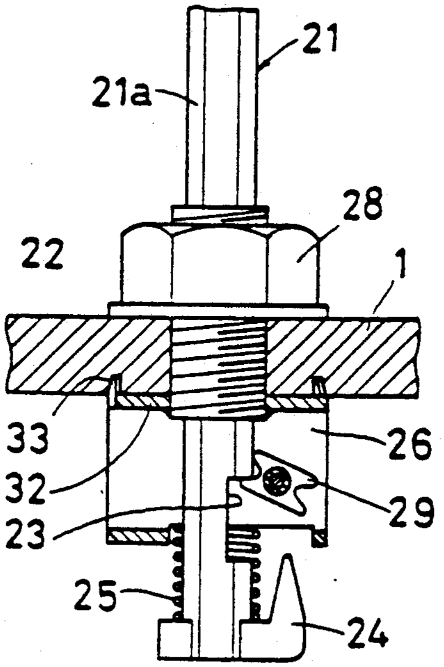
Figure 5C:
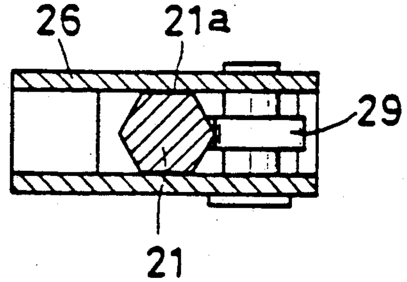

The guide jig shown in FIGS. 5*a* to 5*c* has a guide lever 21 in the shape of a polygonal shaft. Its opposed flat surfaces 21*a* are in contact with the inner sides of the support plate 26 to prevent the lever 21 from turning. The guide jig is also provided with a ring-shaped seating plate 32 secured to the top end of the support plate 26 by welding. The seating plate 32 has its edge partially cut and raised to form claws 33. This arrangement serves to reinforce connection between the support plate 26 and the assembly plate 1. Also, when mounting the guide jig on the plate member 1, the claws 33 will bite into the bottom surface of the plate member 1, thus preventing the guide jig from turning. The guide jig is coated with fluororesin for smooth operation of the guide lever 21.

Figure 6A:
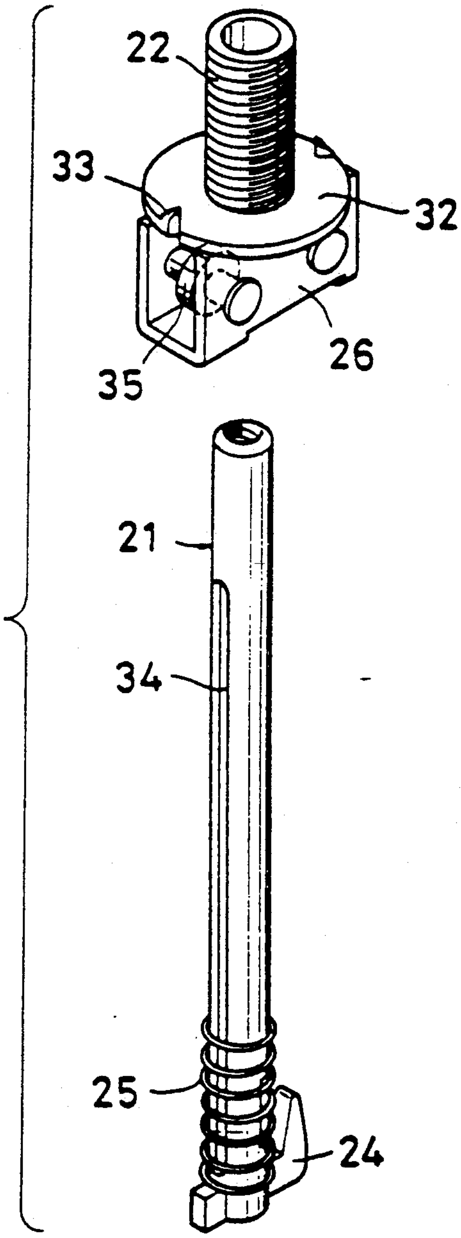
Figure 6B:
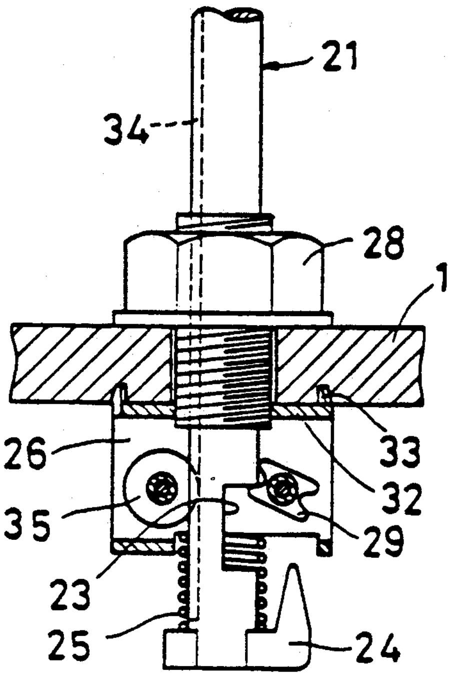
Figure 6C:
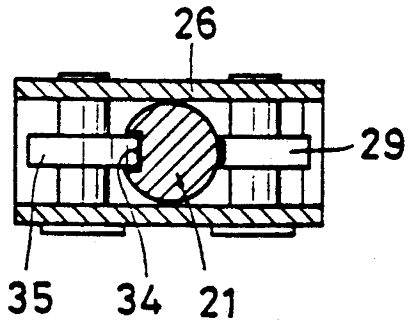

The guide jig shown in FIGS. 6*a* to 6*c* has a guide lever 21 in the shape of a round shaft formed with a longitudinally extending groove 34. Rollers 35 secured to the support plate 26 are inserted in the groove 34 to prevent the guide lever 21 from turning. At the same time, the guide lever 21 is prevented from coming off the assembly comprising members 22, 32, 33, 35 (FIG. 6*a*) by limiting the lengthwise dimension of the groove 34. This guide jig, too, is provided with a seating plate 32 having claws 33.

Figure 7A:
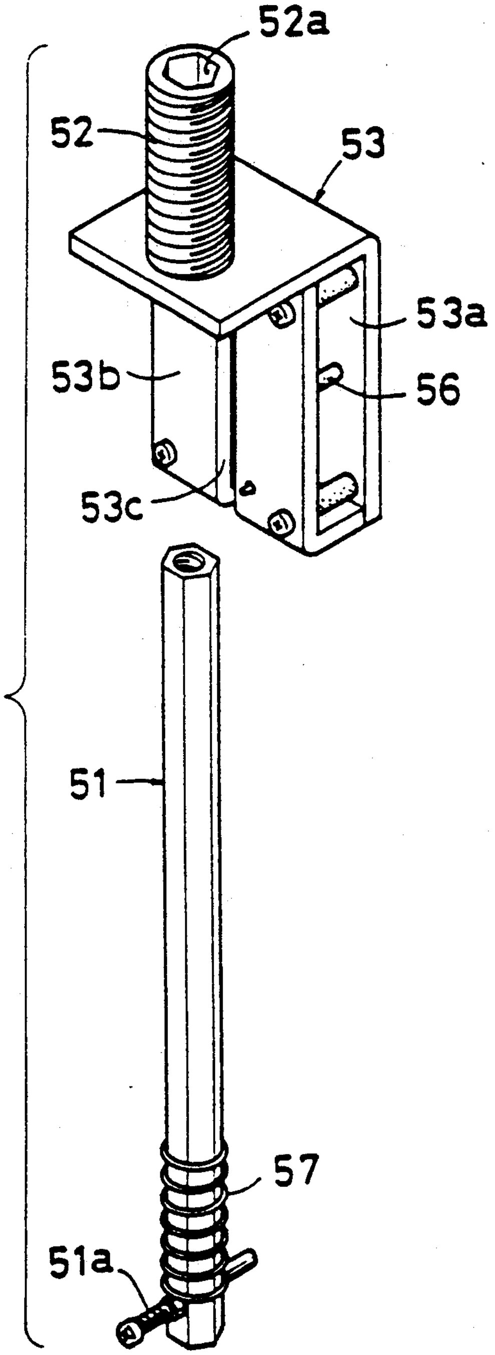
Figure 7B:
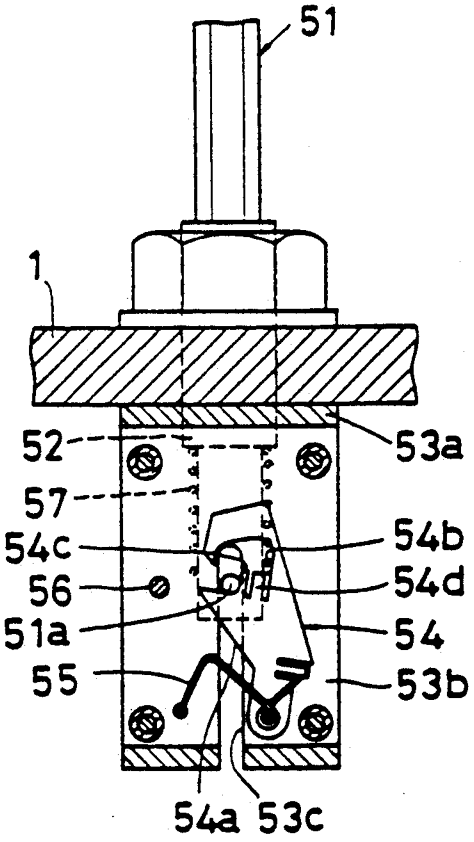

FIGS. 7*a* and 7*b* show a guide jig provided with a conventional locking mechanism. It has a guide lever 51 in the shape of a polygonal shaft and a support sheath 52 formed with a through hole 52*a* having the same cross-section as the guide lever 51 to prevent the guide lever 51 from turning.

As shown in these figures, the guide lever 51 is provided at its bottom end with a projection 51*a* extending therethrough perpendicular to the lever 51, while the support plate 53 is provided with an engaging plate 54 adapted to engage the projection 51*a*. Also, a coil spring 57 is mounted on the guide lever 51 between the bottom end of the support sheath 52 and the projection 51*a*.

The support plate 53 comprises a plate member 53*a* having an L-shaped cross-section and a plate 53*b* provided inside the plate member 53*a* to extend parallel to its vertical wall. A predetermined space is defined therebetween. The plate 53*b* is formed with a groove 53*c* through which the projection 51*a* is adapted to move.

The engaging plate 54 is mounted in the above-mentioned space, between plate 53*b* and plate member 53*a*, at one side of the groove 53*c* in the plate 53*b* so as to be pivotable and inclinable toward the plate member 53*a*. It is biased by a spring 55 toward the other side of the groove 53*c* and the plate 53*a*. Its rotation is restricted by a stopper 56.

Figure 8:
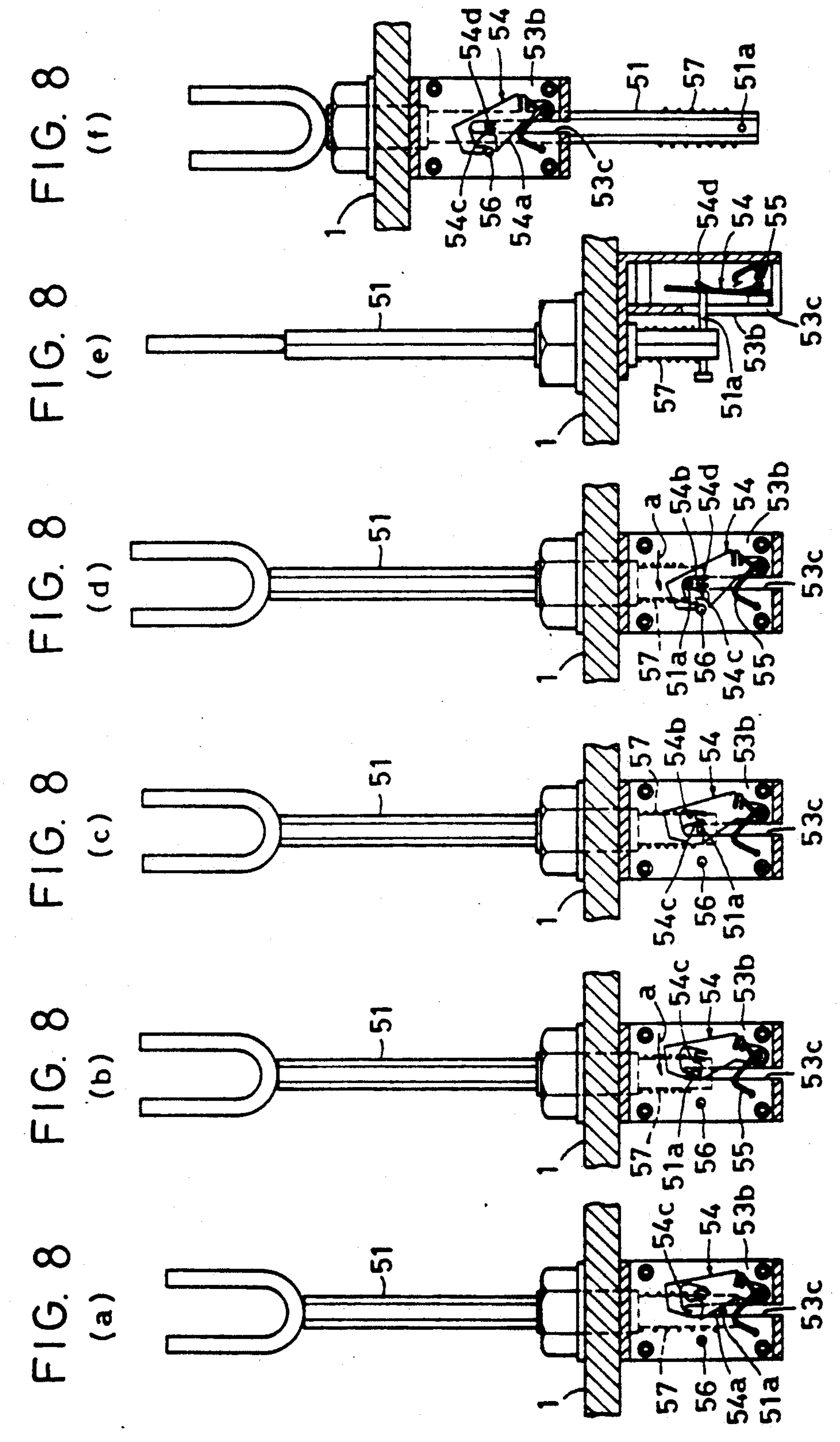
Figure 9:
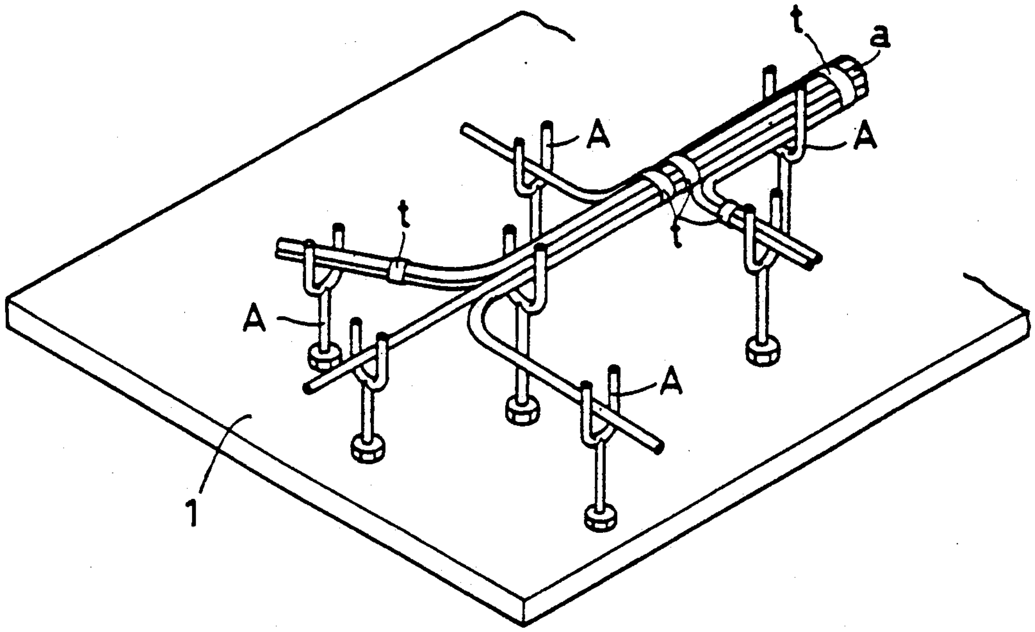
Figure 10A:
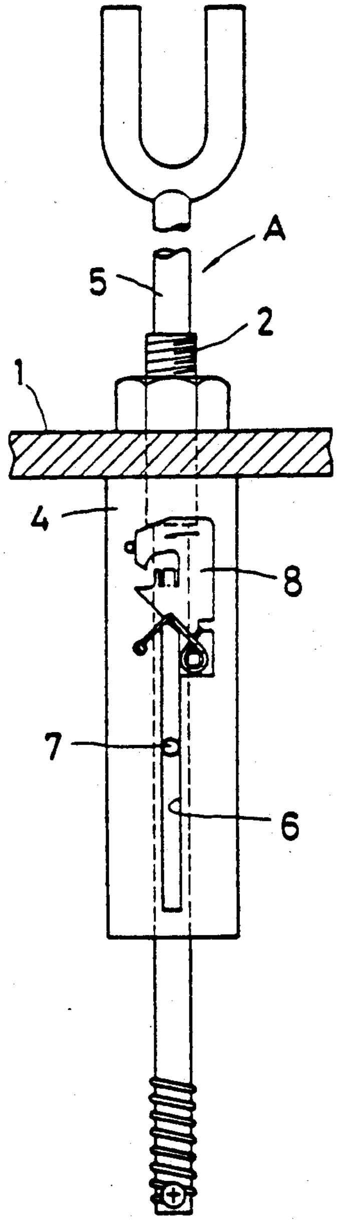
Figure 10B:
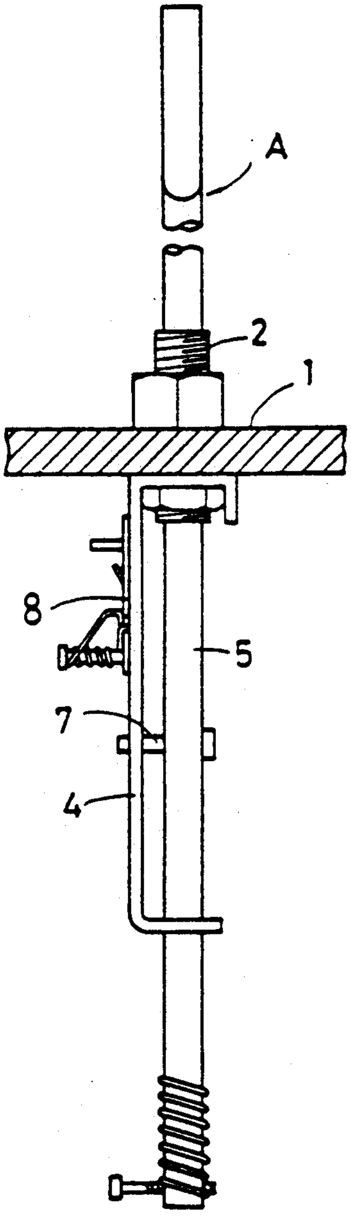

The engaging plate 54 has a cam surface 54*a* extending obliquely upward across the groove 53*c* from the pivoting point and is formed with a cutout 54*b* extending from the top end of the cam surface 54*a* toward the pivoting point. Further, the engaging plate 54 is provided with a projection 54*c* extending upwardly from the central part of the bottom of the cutout 54*b* and adapted to engage the projection 51*a*. Further, at one side of the projection 54*c* near the pivoting point, there is provided an oblique projection 54*d* as shown in FIG. 8*e*. Since the projections 54*c* and 54*d* are bent toward the plate 53*a* as shown in FIG. 8(*e*), the projection 51*a* will not catch on the tips of projections 54*c* and 54*d*.

This locking mechanism operates in the following way. By pulling up the guide lever 51 inserted in the support sheath 52 with its projection 51*a* inside the groove 53*c*, as shown in FIG. 8*a*, the projection 51*a* is adapted to abut the cam surface 54*a*, thus turning the engaging plate 54 toward the pivoting point.

A shown in FIGS. 8*b* and 8*c*, when the projection 51*a* overpasses the top end of the cam surface 54*a*, the engaging plate 54 will pivot in a reverse direction, biased by the spring 55. Thus, the projection 51*a* gets into the cutout 54*b* and is engaged by the projection 54*c*, so that the guide lever 51 is fixed in this position. This state is the level for laying wires.

As shown in FIG. 8*d*, when the guide lever 51 is pulled up further, the projection 51*a* is released from the projection 54*c*, allowing the engaging plate 54 to pivot under the biasing force of the spring 55 until its projection 54*d* is located under the projection 51*a*. When the guide lever 51 is released in this state, as shown in FIGS. 8*e* and 8*f*, it is pushed down biased by the coil spring 57, so that the projection 51*a* descends while pushing the engaging plate 54 toward the plate member 53*a* by abutting the inclined surface of the projection 54*d*. Thus, the engaging plate 54 pivots further to its initial position, i.e. until it abuts the stopper 56. This state is the level for mounting the accessory parts.

What is claimed is:

1. A guide jig for an assembly plate for assembling a wire harness, comprising:

a support sheath extending through said assembly plate and being fixed thereto;

a guide lever axially movably inserted in said support sheath;

a guide member fixed to the top of said guide lever for guiding the wire harness;

said guide lever being provided at the bottom end thereof with an engaging portion;

a support plate fixedly mounted on said support sheath at a portion of said support sheath below said assembly plate, said support plate being provided with locking means for engaging with said engaging portion to releasably hold said guide lever in a pulled-up position;

means for releasing said locking means by pulling said guide lever upward; and guide means for guiding said guide lever so as to be movable vertically along said support sheath and rotatably fixed relative to said support sheath;

said guide means comprising a guide portion provided on said guide lever so as to extend vertically and rotation preventive means provided on one of said support sheath and said support plate for engaging with said guide portion to prevent said guide lever from turning relative to said support sheath.

2. A guide jig as claimed in claim 1, said guide portion comprising flat surfaces formed on said guide lever, said turn preventive means being an inner peripheral surface, which is complementary to said flat surfaces, formed on said guide lever.

3. A guide jig as claimed in claim 1, said guide portion comprising flat surfaces formed on said guide lever, said turn preventive means being the inner sides of said support plate.

4. A guide jig as claimed in claim 1, said guide portion comprising a groove formed in the outer peripheral surface of said guide lever, said turn preventive means being a roller provided on said support plate and rotatably engaging in said groove.

5. A guide jig as claimed in any one of claims 1–4, wherein said engaging portion is a groove 23 formed in said guide layer 21 so as to extend longitudinally and wherein said locking mechanism comprises a cam plate 29 pivotally mounted on said support plate 26, an L-shaped piece 24 fixedly mounted at the bottom end of said guide lever 21, and a spring 25 mounted on said guide lever 21 between said L-shaped piece 24 and said support plate 26, said cam plate 29 being substantially in the form of a letter H with bifurcated projections arranged symmetrically with respect to the center of rotation thereof, said cam plate extending perpendicular to the plane of said groove 23 so that said bifurcated projections will be positioned so as to get into said groove 23, said groove 23 having such a depth and length that said cam plate 29 can turn with the bifurcated projections of said cam plate 29 in said groove 23, the distance between the center of rotation of said cam plate 29 and the side of said cam lever 21 being set to be longer than the distance between said center of rotation and the side edge of said cam plate 29, said L-shaped piece 24 having a first portion extending parallel to said assembly plate for a predetermined length L and a second portion extending vertically from the free end of said first portion toward said assembly plate, said length L being set so that a tip 24*a* of said L-shaped piece 24 will move within the range of rotation of said cam plate 29, said spring 25 being positioned so that, when one of the bifurcated projections of said cam plate 29 comes into abutment with the top end of said groove and the other with the side of said guide lever, its top end 25*a* is pressed against said support plate, said L-shaped piece 24 having a vertical length such that, when said spring 25 is compressed to the limit, its tip 24*a* engages between the lower bifurcated projections of said cam plate 29 and abuts therewith so that only one of the upper bifurcated projections gets in said groove 23.

6. A guide jig as claimed in any one of claims 1–4, wherein said engaging portion is a projection 51*a* provided at bottom of said guide lever 21 and wherein said locking means comprises an engaging plate 54 pivotally mounted on said support plate 53 and a coil spring 57 mounted on said guide lever 51 between the bottom end of said support sheath 52 and said projection 51*a*, said engaging plate 54 being supported so as to be pivotable toward one side of the path of said projection 51*a* and to be inclinable toward the tip of said projection 51*a* and biased by a spring 55 toward the other side of the path of said projection 51*a*, said engaging plate 54 being provided with a cam surface 54*a* extending obliquely upwards from its pivoting point across said path of said projection 51*a* and with a cutout 54*b* extending from the top end of said cam surface 54*a* toward said pivoting point, said engaging plate 54 being further provided with a projecting piece 54*c* extending vertically from the center of the bottom edge of said cutout 54*b* to engage said projection and with a projecting piece 54*d* located at one side of said projecting piece 54*c* near said pivoting point and inclining toward the tip of said projection 51*a*, said projecting pieces 54*c* and 54*d* defining a space therebetween through which said projection 51*a* can pass.

* * * * *